United States Patent
Jang

(10) Patent No.: US 12,258,720 B2
(45) Date of Patent: Mar. 25, 2025

(54) ELASTIC BOLLARD FOR RACK PROTECTION

(71) Applicant: Jeong Eun Jang, Seoul (KR)

(72) Inventor: Jeong Eun Jang, Seoul (KR)

( * ) Notice: Subject to any disclaimer, the term of this patent is extended or adjusted under 35 U.S.C. 154(b) by 0 days.

(21) Appl. No.: 18/387,502

(22) Filed: Nov. 7, 2023

(65) Prior Publication Data

US 2024/0352689 A1    Oct. 24, 2024

(30) Foreign Application Priority Data

Apr. 20, 2023  (KR) .......................... 10-2023-0051688

(51) Int. Cl.
| | | |
|---|---|---|
| *E01F 9/623* | (2016.01) | |
| *E01F 9/627* | (2016.01) | |
| *E01F 9/673* | (2016.01) | |

(52) U.S. Cl.
CPC .............. *E01F 9/627* (2016.02); *E01F 9/673* (2016.02)

(58) Field of Classification Search
CPC . E01F 9/623; E01F 9/627; E01F 9/629; E01F 9/673
USPC ................................................ 404/10; 40/608
See application file for complete search history.

(56) References Cited

U.S. PATENT DOCUMENTS

| | | | | |
|---|---|---|---|---|
| 1,367,830 A * | 2/1921 | Poole | ...................... | E01F 9/627 |
| | | | | 40/608 |
| 1,443,204 A * | 1/1923 | Bernsein | ................. | E01F 9/617 |
| | | | | 40/608 |
| 1,828,892 A * | 10/1931 | Felton | ...................... | E01F 9/627 |
| | | | | 40/608 |
| 1,877,074 A * | 9/1932 | Stanziale | ................. | E01F 9/629 |
| | | | | 52/166 |
| 4,373,464 A * | 2/1983 | Blau | ....................... | E01F 9/627 |
| | | | | 116/63 R |
| 5,404,682 A * | 4/1995 | West | ....................... | E01F 9/642 |
| | | | | 52/114 |
| 6,367,494 B1 * | 4/2002 | Tung | ....................... | E01F 9/662 |
| | | | | 135/48 |
| 10,568,449 B1 * | 2/2020 | Gathers | .................... | F21V 21/10 |

FOREIGN PATENT DOCUMENTS

| | | | | |
|---|---|---|---|---|
| GB | 2446858 A | * | 8/2008 | .............. E01F 9/629 |
| GB | 2491206 A | * | 11/2012 | .............. E01F 9/629 |
| KR | 2019001516 U | * | 6/2019 | .............. E01F 9/629 |
| KR | 102418841 | | 7/2022 | |
| WO | WO-2019030295 A1 | * | 2/2019 | .............. E01F 9/627 |

* cited by examiner

*Primary Examiner* — Gary S Hartmann

(74) *Attorney, Agent, or Firm* — IPLA P.A.

(57) ABSTRACT

An elastic bollard for rack protection includes: a buffer part (30) mounted on ground; a vertical pole (50) coupled to the buffer part; a case part which includes a case upper part (11) having a through-insertion port (11*a*) formed on an upper surface thereof so that the vertical pole penetrates and protrudes to the outside, and a case lower part (12) integrally coupled to a lower end of the case upper part, and forms an internal space to cover the buffer part (30); an elastic part (40) provided between a bottom surface of the case upper part and an upper surface of the buffer part; and a pedestal part on which the buffer part is mountable.

6 Claims, 10 Drawing Sheets

40

42

ELASTIC BOLLARD FOR RACK PROTECTION

BACKGROUND

The present invention relates to an elastic bollard for rack protection, and more particularly, to an elastic bollard for rack protection that is installed in front of a rack structure to effectively buffer external shock and prevent damage to a rack structure.

In general, a vertical multistage rack structure is used in distribution warehouses, stores, and the like to store items in unit of box or pallet in a space-efficient manner. Since racks are constructed in a multistage, the racks need to be manufactured very rigidly to support the load of the rack structure itself and the items loaded on each stage of the rack, and the external shocks applied to the rack structure need to be minimized, so that it is possible to prevent a safety accident in which a part of the rack structure is damaged and the structure collapses in advance.

In the large warehouses, a forklift or the like is used to load and transport product pallets, stack them on shelf racks in multistage, and remove them from shelf racks. A fork lift is provided at the front part of the forklift, and after inserting the fork into a space between pallets, the pallet is lifted and transported. When transporting the product pallets using the forklift, there were frequent cases where a forklift driver was careless or the driver's forward vision was blocked by the pallet, or the like, resulting in shock being applied to the warehouse structures, that is, a vertical post of the shelf racks.

The above-mentioned shock and the load of products loaded in multiple stages may weaken the structure of the shelf rack, and if collisions are repeated, the shelf rack itself may collapse, leading to a major disaster. Therefore, bollards or bollard fences were installed at regular intervals on the ground in front of the shelf racks to prevent direct shock from being applied to the shelf racks. A typical bollard inserts and installs a lower part of a support pipe provided with a buffer part into a pipe holder whose lower part is embedded in the ground, thereby aiming to prevent a local deformation of the support pipe and disperse the shock, as in a bollard with a pedestrian protection function of Korean Patent Application No. 10-2021-0160961. However, since the bollard was fixed to the ground and installed upright, its shock mitigation effect in all directions was limited.

In this regard, the present invention relates to an elastic bollard for rack protection that is installed on the ground and has an elastic force capable of alleviating external shocks in all directions.

SUMMARY OF THE INVENTION

The present invention provides an elastic bollard for rack protection that can smoothly buffer shocks caused by collisions that may occur in all directions.

In order to solve the above problem, the present invention provides an elastic bollard for rack protection that includes a pedestal part installed on the ground; a buffer part that can be attached to the upper surface of the pedestal part; a vertical pole that engages the buffer part; and a case part which has a through-insertion port formed on the upper surface so that the vertical pole penetrates and can protrudes to the outside, includes an internal space to cover the pedestal part and the buffer part, and includes a ground-fixing part that can be firmly fixed to the ground.

In addition, the present invention provides an elastic bollard for rack protection that includes an elastic part including one of an individual spring, a cylinder spring or an elastic body between a bottom surface of the case part and the upper surface of the buffer part, in which the shock can be absorbed and alleviated when the vertical pole tilts due to external force.

In addition, the present invention provides an elastic bollard for rack protection that includes an elastic buffer part in the case part itself, in which the external shock can be alleviated.

The present invention relates to an elastic bollard for rack protection, wherein when a shock is applied to a vertical pole installed upright on the ground from multiple directions, the vertical pole tilts in the direction in which the external force is applied, and has advantages that since the elastic part is installed inside, the vertical pole tils in the direction of application of the external force, and simultaneously can be restored to its original upright state due to the elastic force, thereby more effectively absorbing and alleviating shocks, and furthermore, since the case part itself is equipped with an elastic buffer part, it is possible to maximize a shock alleviation effect.

DETAILED DESCRIPTION OF THE INVENTION

Figure 1:
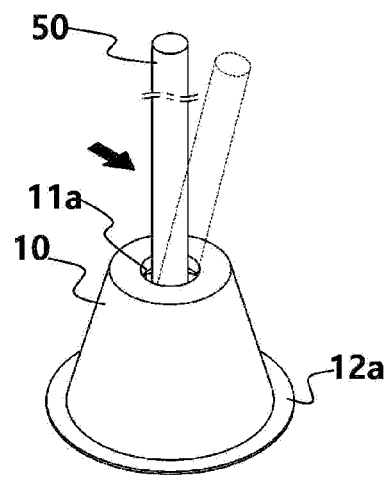
FIGS. 1 to 4 are perspective views of an elastic bollards for rack protection.
Figure 2:
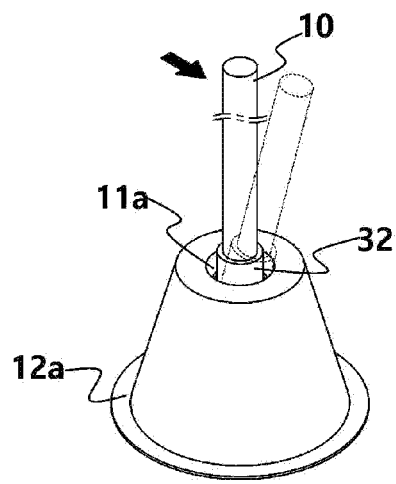
Figure 3:
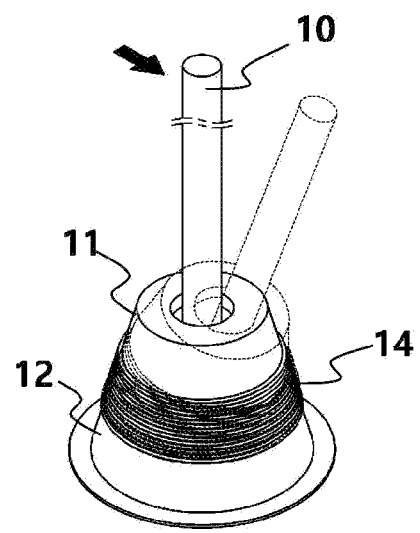
Figure 4:
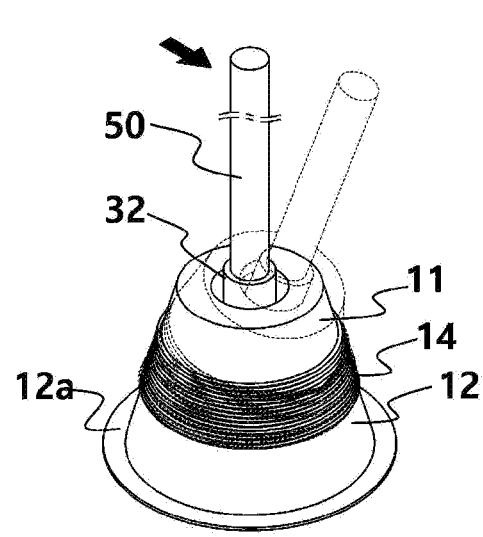
Figure 5A:
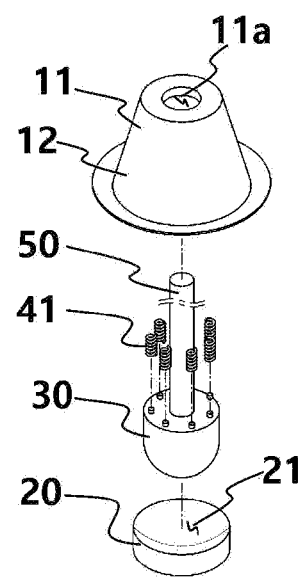
FIGS. 5a to 5c are separated perspective views and cross-sectional views of individual springs installed in the elastic bollard for rack protection.
Figure 5B:
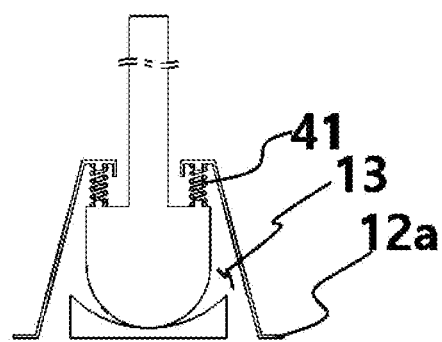
Figure 5C:
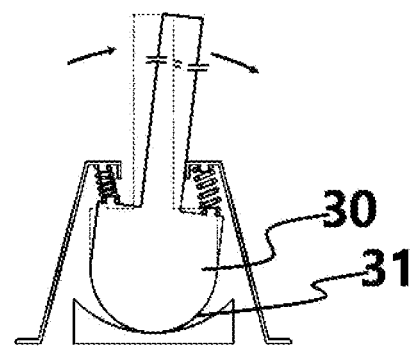
Figure 6A:
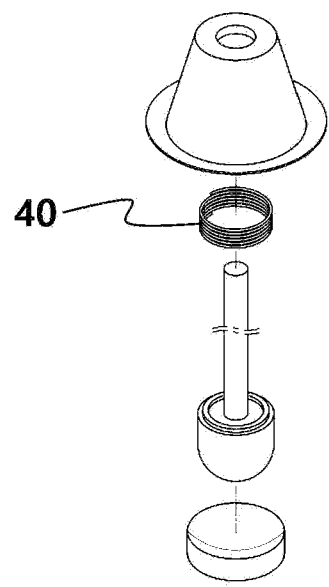
FIGS. 6a to 6c are separated perspective views and cross-sectional views of a cylinder spring installed in the elastic bollard for rack protection.
Figure 6B:
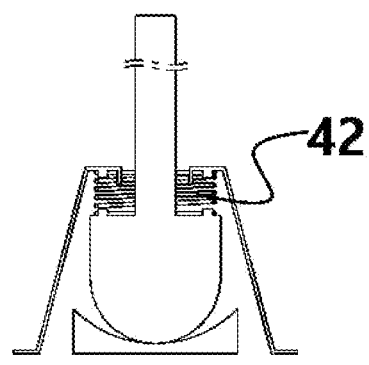
Figure 6C:
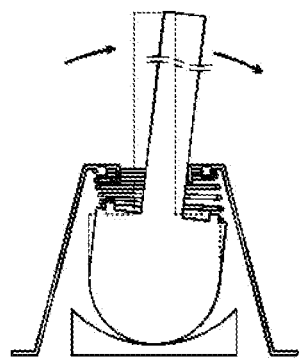
Figure 7A:
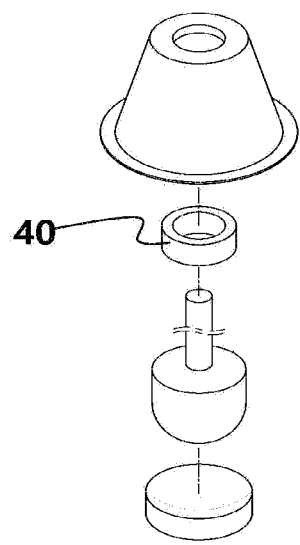
FIGS. 7a to 7c are exploded perspective views and cross-sectional views of an elastic body installed in the elastic bollard for rack protection.
Figure 7B:
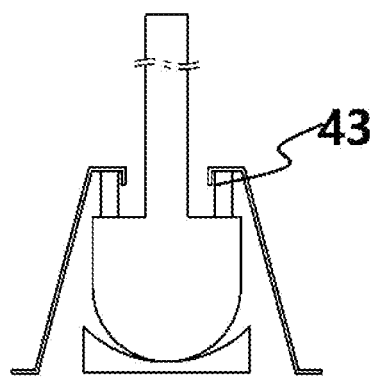
Figure 7C:
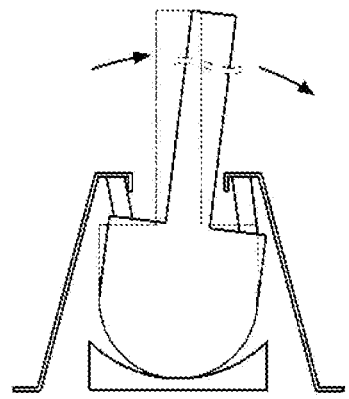
Figure 8A:
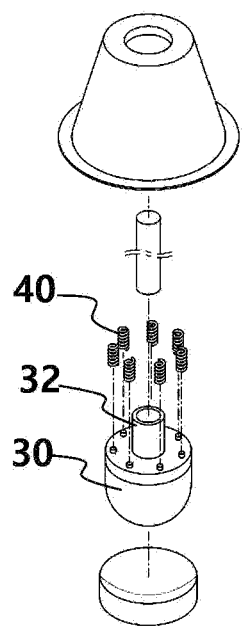
FIGS. 8a to 8c are exploded perspective views and cross-sectional views of a socket part and individual springs provided in the elastic bollard for rack protection.
Figure 8B:
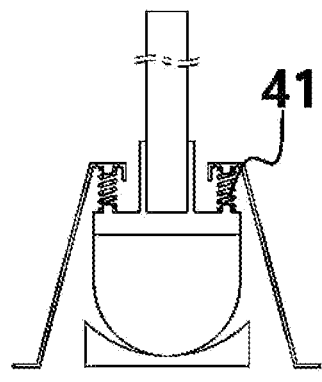
Figure 8C:
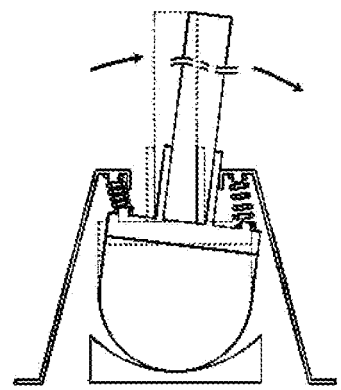
Figure 9A:
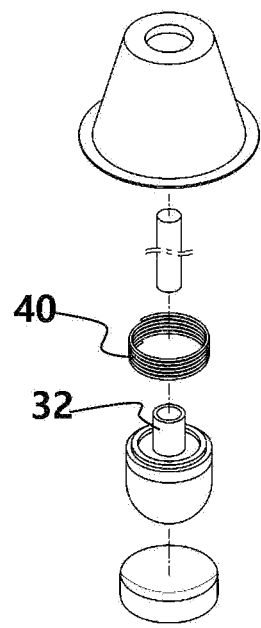
FIGS. 9a to 9c are exploded perspective views and cross-sectional views of a socket part and a cylinder spring provided in the elastic bollard for rack protection.
Figure 9B:
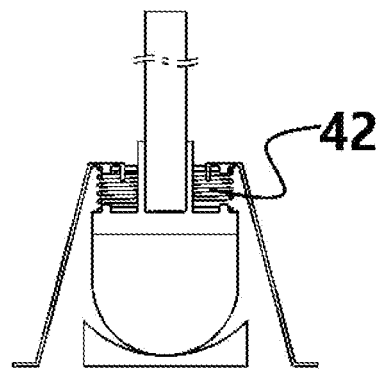
Figure 9C:
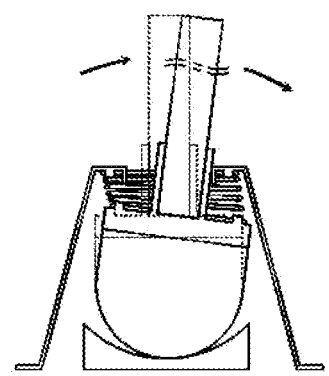
Figure 10A:
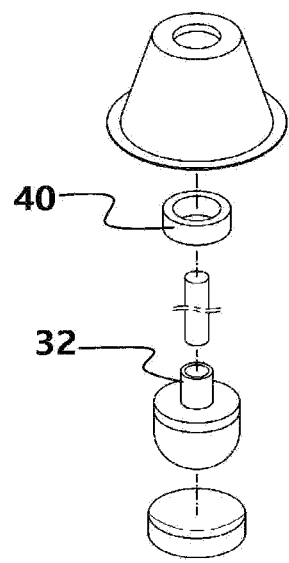
FIGS. 10a to 10c are exploded perspective views and cross-sectional views of a socket part and an elastic body provided in the elastic bollard for rack protection.
Figure 10B:
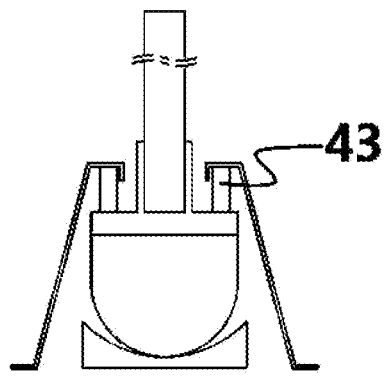
Figure 10C:
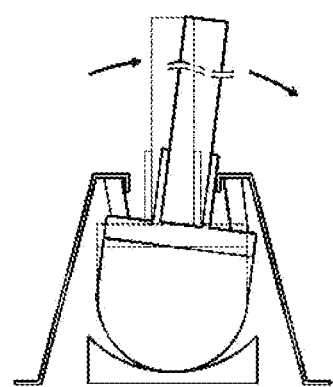

Hereinafter, the present invention will be described in more detail with reference to the accompanying drawings.

Prior to this, the terms and words used in the present specification and claims should not be construed as limited to ordinary or dictionary meanings, and should be construed in a sense and concept consistent with the technical idea of the present invention, based on the principle that the inventor can properly define the concept of a term to describe his/her invention in the best way possible.

Therefore, the embodiments described in the present specification and the configurations shown in the drawings are only one of the most preferred embodiments of the present invention, and do not substitute all of the technical ideas of the present invention. Accordingly, it should be understood that there may be various possible equivalents and modifications.

The present invention relates to an elastic bollard for rack protection.

Broadly, the present invention relates to an elastic bollard for rack protection includes a pedestal part 20 installed on the ground; a buffer part 30 that can be attached to the upper surface of the pedestal part or directly installed on the ground; a vertical pole 50 that engages the buffer part; and a case part 10 which has a through-insertion port 11*a* formed on the upper surface so that the vertical pole penetrates and can protrudes to the outside, includes an internal space 13 to cover the pedestal part 20 and the buffer part 30, and includes a ground-fixing part 12*a* that can be firmly fixed to the ground, wherein the elastic part 40 includes one of an individual spring 41, a cylinder spring 42 or an elastic body 43 between a bottom surface of the case part and the upper surface of the buffer part, so that it is possible to absorb and alleviate the shock when the vertical pole 50 is tilted by external force.

More specifically, the case part 10 is made up of a case upper part 11 having a through-insertion port 11*a* formed on its upper surface; and a case lower part 12 coupled to a lower end of the case upper part and having a ground-fixing part 12*a* formed at the lower end thereof, and thus either the case upper and lower parts 11 and 12 are integrally coupled, or the elastic buffer part 14 is integrally coupled between the case upper and lower parts. That is, the case upper part and the case lower part are a single case part integrated to form an internal space part, and the case upper part, the case lower part, and the elastic buffer part are also a single case part integrated to form an internal space part 13.

In addition, the pedestal part 20 has a bottom surface fixed to the ground, and a recessed part 21 formed on the upper surface thereof.

In addition, the buffer part 30 has a mounting part 31 on its bottom surface so as to be mounted on the recessed part 21 of the pedestal part or installed directly on the ground, a socket part 32 may be further positioned on the upper surface of the buffer part, and the buffer part 30 may be made of metal or a synthetic resin material having elasticity. That is, the material of the pedestal part can be used selectively as needed.

The form of the pedestal part and the form of the buffer part are not limited to the forms shown in the drawings of the present application, the form of the pedestal part can be modified depending on the ground on which it is installed or the installation method, the recessed part of the pedestal part can also be manufactured in various forms depending on the form of the mounting part of the bottom surface of the buffer part, and the mounting part of the bottom surface of the buffer part can also be modified depending on the form of the ground on which it is installed, the installation method, or the form of the pedestal part.

In addition, the vertical pole 50 may be manufactured integrally with the buffer part 30, or may be fixedly coupled to the socket part 32 located on the upper surface of the buffer part.

The socket part may be manufactured integrally with the buffer part, or the buffer part and the socket part may be manufactured separately and then coupled or assembled, and especially when the socket part and the buffer part are made of different materials, they can be manufactured separately and then coupled or assembled. If the socket part and the buffer part are made of the same material, they can be manufactured integrally or separately manufactured and then coupled or assembled.

In addition, the elastic part 40 can be installed on the bottom surface of the case upper part 11 and the upper surface of the buffer part, and may be made up of one or more individual springs 41 installed on the upper surface of the outer corner buffer part of the vertical pole 50, one or more cylinder springs 42 installed by passage of the vertical pole 50, or one or more elastic bodies 43 installed by passage of the vertical pole 50. The elastic body 43 is made of a synthetic resin material with elasticity, and can be manufactured in the form of a doughnut or a doughnut with an upper surface molded in a serrated form (not shown). Protrusions (not shown) or the like for fixing each elastic part can be formed on the bottom surface of the case upper part and the upper surface of the buffer part to fix the elastic part 40 so that the elastic part is installed on the bottom surface of the case upper part 11 and on the upper surface of the buffer part 30 and is not detached. Since this is obvious by inference from known technology, it will not be explained separately.

Bolts, nuts, or anchor bodies can be used to install the pedestal part or the buffer part on the ground, but the installation method thereof will not be explained separately since it is obvious from existing known inventions.

In addition, in order to fixedly install the case part on the ground, the case part can be fixedly installed on the ground by fastening bolts, nuts, or anchor bodies to the ground fixing part 12*a*. Since the installation method is obvious by inference from known technology, it will not be explained separately.

Figure 11A:
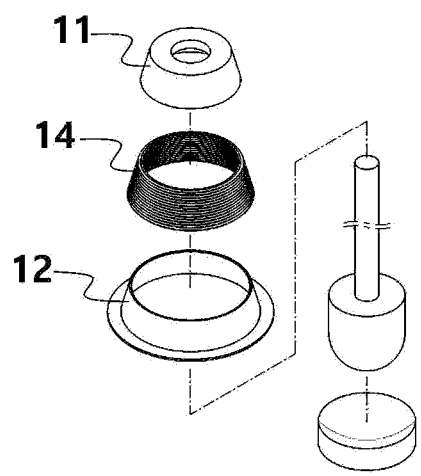
FIGS. 11a to 11c are exploded perspective views and cross-sectional views of an elastic buffer part provided between the case upper and lower parts in the elastic bollard for rack protection.
Figure 11B:
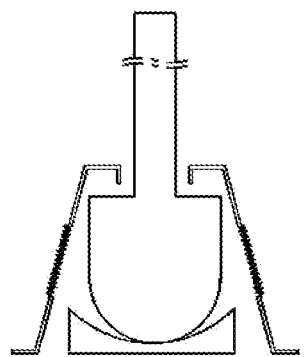
Figure 11C:
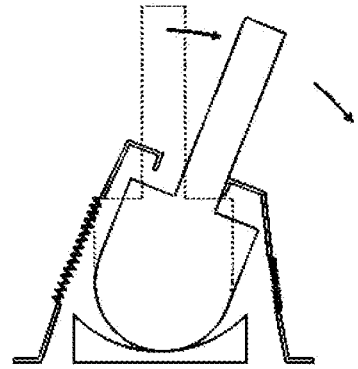
Figure 12A:
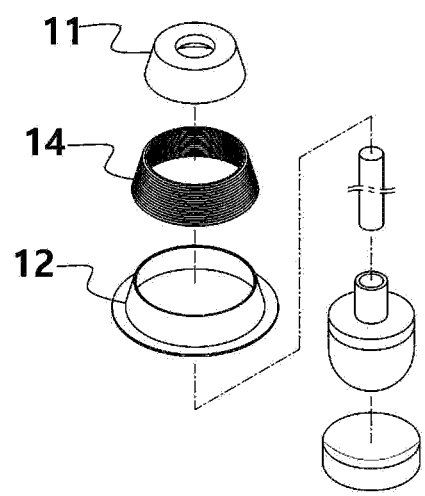
FIGS. 12a to 12c are exploded perspective views and cross-sectional views of an elastic buffer part and a socket part provided between the case upper and lower parts of the elastic bollard for rack protection.
Figure 12B:
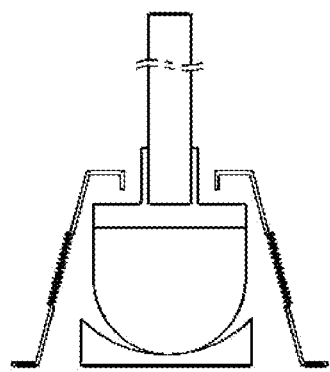
Figure 12C:
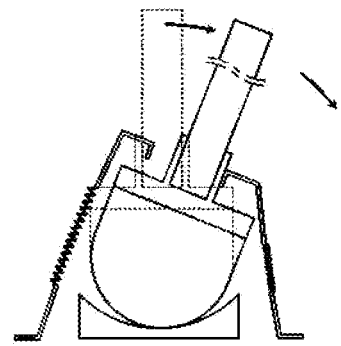
Figure 13:
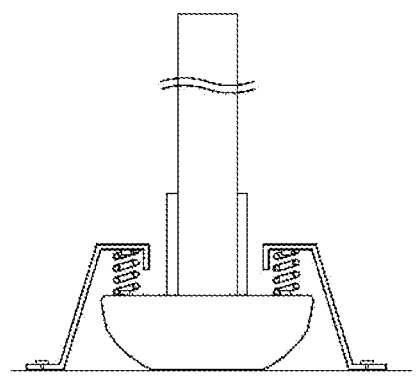
FIG. 13 is an exemplary view of the buffer part of the elastic bollard for rack protection installed directly to the ground.

As an Example, as shown in FIGS. 1 to 4, when an external force is applied to the vertical pole 50 from the left side, the vertical pole tilts to the right side. After the right side portion of the elastic part 40 installed on the bottom surface of the case upper part and the upper surface of the buffer part is compressed by the left external force, the vertical pole is resorted to an upright state by the elastic force of the compressed right side portion of the elastic part. In addition, as shown in FIGS. 11*c* and 12*c*, when the left external force is applied to the vertical pole, the vertical pole tilts on limitation of the right inner wall of the through-insertion port formed at the top of the case. At this time, if the left external force is strong, the right side part of the elastic buffer part 14 is compressed between the case upper and lower parts, causing the vertical pole to further tilt toward the right side, and the elastic force of the right side of the elastic buffer part causes the vertical pole to restore to the upright state.

When an external force is applied to the vertical pole, the vertical pole tilts on limitation of the inner wall of the through-insertion port, and the more the vertical pole tilts, the more the elastic part is compressed.

The present invention has been described above with reference to specific matters such as specific components and limited Examples and drawings, but these are provided only to help a more comprehensive understanding of the present invention. The present invention is not limited to the above Examples, and various modifications and variations can be made from such descriptions by those skilled in the art to which the present invention pertains.

Therefore, the spirit of the present invention should not be limited to the described Examples, and it is said that the claims to be explained below and all modifications that are equivalent or have equivalent modifications to the claims belongs to scope of the present invention.

DESCRIPTION OF SYMBOLS

10: Case part
11: Case upper part
11a: Through-insertion port
12: Case lower part
12a: Ground-fixing part
13: Internal space part
14: Elastic buffer part
20: Pedestal part
21: Recessed part
30: Buffer part
31: Mounting part
32: Socket part
40: Elastic part
41: Individual spring
42: Cylinder spring
43: Elastic body
50: Vertical pole

The invention claimed is:

1. An elastic bollard for rack protection, comprising:
a buffer part (30);
a vertical pole (50) coupled to the buffer part;
a case part which includes a case upper part (11) having a through-insertion port (11a) formed on an upper surface thereof so that the vertical pole penetrates and protrudes to the outside, and a case lower part (12) integrally coupled to a lower end of the case upper part, and forms an internal space to cover the buffer part (30);
an elastic part (40) provided between a bottom surface of the case upper part and an upper surface of the buffer part; and
a pedestal part on which the buffer part is mountable, wherein an external shock can be absorbed and alleviated, and when the vertical pole (50) is tilted due to an external force, the elastic part is compressed, and the elastic force of the compressed elastic part allows the vertical pole to restore to an upright state.

2. The elastic bollard for rack protection according to claim 1, further comprising:
an elastic buffer part (14) coupled integrally between the case upper part and the case lower part of the case part, wherein, when a left external force is applied to the vertical pole, a right side portion of the elastic buffer part (14) is compressed, the vertical pole is tilted to the right, a right side portion of the elastic buffer is compressed, and the vertical pole restores to an upright state due to elastic force of the compressed elastic buffer part.

3. The elastic bollard for rack protection according to claim 1, further comprising:
a recessed part (21) formed on the upper surface of the pedestal part (20); and
a convex mounting part (31) formed on a bottom surface of the buffer part (30) so as to be mounted on the recessed part (21) of the pedestal part.

4. The elastic bollard for rack protection according to claim 1, further comprising:
a socket part located on, assembled or integrally coupled to the upper surface of the buffer part, so that the vertical pole can be fixedly installed in the socket part (32).

5. The elastic bollard for rack protection according to claim 2, further comprising:
a socket part located on, assembled or integrally coupled to the upper surface of the buffer part, so that the vertical pole can be fixedly installed in the socket part (32).

6. The elastic bollard for rack protection according to claim 1, wherein the elastic part is made up of one or more individual springs, one or more cylinder springs, or one or more elastic bodies, and wherein the one or more individual springs are provided on the upper surface of the buffer part outside of the vertical pole (50), the one or more cylinder springs are installed to pass by the vertical pole (50), or the one or more elastic bodies (43) are made of synthetic resin.

* * * * *